(12) United States Patent
Burd

(10) Patent No.: US 10,518,862 B2
(45) Date of Patent: Dec. 31, 2019

(54) AIRCRAFT MONUMENT INTEGRATED ATTACHMENT DEVICE

(71) Applicant: B/E Aerospace, Inc., Wellington, FL (US)

(72) Inventor: Peter John Leslie Burd, Carmarthenshire (GB)

(73) Assignee: B/E Aerospace, Inc., Winston-Salem, NC (US)

( * ) Notice: Subject to any disclaimer, the term of this patent is extended or adjusted under 35 U.S.C. 154(b) by 458 days.

(21) Appl. No.: 15/463,876

(22) Filed: Mar. 20, 2017

(65) Prior Publication Data

US 2017/0190408 A1 Jul. 6, 2017

Related U.S. Application Data

(63) Continuation of application No. 13/851,838, filed on Mar. 27, 2013, now Pat. No. 9,599,138.

(Continued)

(51) Int. Cl.
  *B64D 11/04* (2006.01)
  *B64C 1/00* (2006.01)
  (Continued)

(52) U.S. Cl.
  CPC .............. *B64C 1/00* (2013.01); *B64D 11/02* (2013.01); *B64D 11/04* (2013.01);
  (Continued)

(58) Field of Classification Search
  CPC ......... B64D 11/00; B64D 11/02; B64D 11/04; B64D 11/06; B64D 11/0696; B64D 9/00; B64D 9/003; B60P 7/08; B60P 7/0815
  See application file for complete search history.

(56) References Cited

U.S. PATENT DOCUMENTS

| 2,402,254 A | 6/1946 | Maddock et al. |
| 4,456,206 A * | 6/1984 | Tijssen ................... B64D 11/00 244/118.5 |

(Continued)

FOREIGN PATENT DOCUMENTS

| CN | 1930040 A | 3/2007 |
| CN | 101035695 A | 9/2007 |

(Continued)

OTHER PUBLICATIONS

International Search Report and Written Opinion dated Jun. 13, 2013 for PCT/US2013/034357.

(Continued)

*Primary Examiner* — Daniel J Wiley
(74) *Attorney, Agent, or Firm* — Suiter Swantz pc llo

(57) ABSTRACT

In a preferred embodiment, systems and methods for connecting a monument attachment apparatus to an aircraft panel include a monument attachment apparatus having a first aperture configured to receive a fastener, a user's fingers and a tool to fasten the fastener, as well as a pair of substantially parallel, and a second aperture in a plane substantially perpendicular to a plane of the first aperture which is configured to align with a corresponding receptacle disposed on a structural frame of an aircraft cabin. In connecting, a first plate is bonded to an interior surface of a first exterior wall of the panel, a second plate is bonded to an interior surface of a second interior wall of the panel, and a portion of a core of the panel is disposed in a gap between the pair of plates and bonded to a portion of an interior surface of each plate.

20 Claims, 2 Drawing Sheets

Related U.S. Application Data

(60) Provisional application No. 61/616,952, filed on Mar. 28, 2012.

(51) Int. Cl.
*F16B 9/02* (2006.01)
*B64D 11/02* (2006.01)
*B64D 11/06* (2006.01)
*B64D 11/00* (2006.01)

(52) U.S. Cl.
CPC .......... *B64D 11/0696* (2013.01); *F16B 9/026* (2013.01); *B64D 2011/0046* (2013.01); *B64D 2011/0069* (2013.01); *Y02T 50/46* (2013.01); *Y10T 403/39* (2015.01)

(56) References Cited

U.S. PATENT DOCUMENTS

| | | | |
|---|---|---|---|
| 5,082,224 A | 1/1992 | Hayward | |
| 5,083,727 A | 1/1992 | Pompei et al. | |
| 5,222,694 A * | 6/1993 | Smoot | B64C 1/066 |
| | | | 244/119 |
| 5,462,623 A | 10/1995 | Day | |
| 5,520,357 A * | 5/1996 | Payne | B61D 45/006 |
| | | | 244/118.1 |
| 5,625,926 A | 5/1997 | Berrezouga | |
| 6,318,672 B1 * | 11/2001 | Traylor | B64D 11/00 |
| | | | 244/118.5 |
| 6,715,974 B2 | 4/2004 | Stotzer et al. | |
| 7,318,695 B2 | 1/2008 | Yu et al. | |
| 7,374,131 B2 * | 5/2008 | Tiid | B64D 9/003 |
| | | | 244/118.5 |
| 7,429,190 B2 | 9/2008 | Hueber | |
| 8,235,345 B2 | 8/2012 | Sadil et al. | |
| 8,444,359 B2 | 5/2013 | Grether et al. | |
| 8,726,472 B2 | 5/2014 | Lu | |
| 8,833,721 B2 | 9/2014 | Sadil et al. | |
| 9,150,141 B2 | 10/2015 | Daouk | |
| 9,174,735 B2 * | 11/2015 | Klepka | B64D 11/00 |
| 9,701,217 B2 * | 7/2017 | Eckenroth | B60N 2/01525 |
| 2003/0077140 A1 | 4/2003 | Stotzer et al. | |
| 2005/0173608 A1 * | 8/2005 | Lory | B60P 7/0815 |
| | | | 248/418 |
| 2006/0051177 A1 | 3/2006 | Yu et al. | |
| 2008/0237440 A1 | 10/2008 | Lester et al. | |
| 2009/0272123 A1 | 11/2009 | Sadil et al. | |
| 2010/0308190 A1 * | 12/2010 | Tkocz | B64D 11/04 |
| | | | 248/222.14 |
| 2011/0309194 A1 * | 12/2011 | Pangalila | B64D 11/04 |
| | | | 244/118.5 |
| 2012/0272522 A1 | 11/2012 | Sadil et al. | |
| 2013/0081233 A1 | 4/2013 | Lu | |
| 2013/0126673 A1 | 5/2013 | Umlauft et al. | |
| 2013/0280011 A1 * | 10/2013 | Burd | B64D 11/0023 |
| | | | 411/371.2 |

FOREIGN PATENT DOCUMENTS

| | | |
|---|---|---|
| CN | 101856981 A | 10/2010 |
| DE | 9303666 U1 | 5/1993 |
| DE | 102004012262 A1 | 9/2005 |
| DE | 202008003772 U1 | 7/2008 |
| DE | 102008064120 A1 | 7/2010 |
| DE | 102010018272 A1 | 10/2011 |
| EP | 1626470 A2 | 2/2006 |
| FR | 2943986 A1 | 10/2010 |
| JP | 2007528820 A | 10/2007 |
| JP | 2011515262 A | 5/2011 |
| JP | 2011126302 A | 6/2011 |
| WO | 0168401 A1 | 9/2001 |
| WO | 2008079181 A2 | 7/2008 |

OTHER PUBLICATIONS

International Preliminary Report on Patentability dated Oct. 1, 2014 for PCT/US2013/034357.

Search Report for Chinese Application No. 2013800174153.

\* cited by examiner

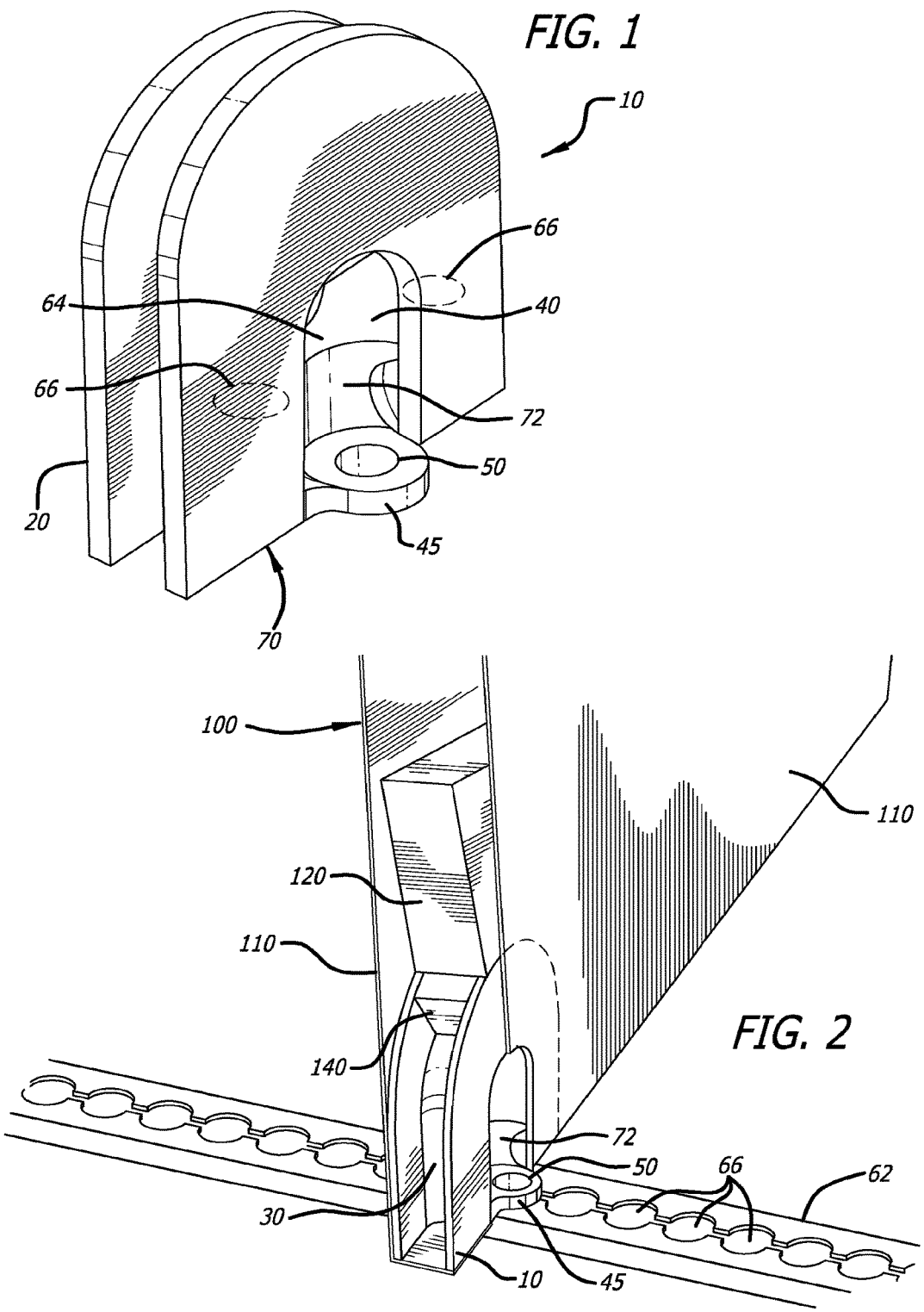

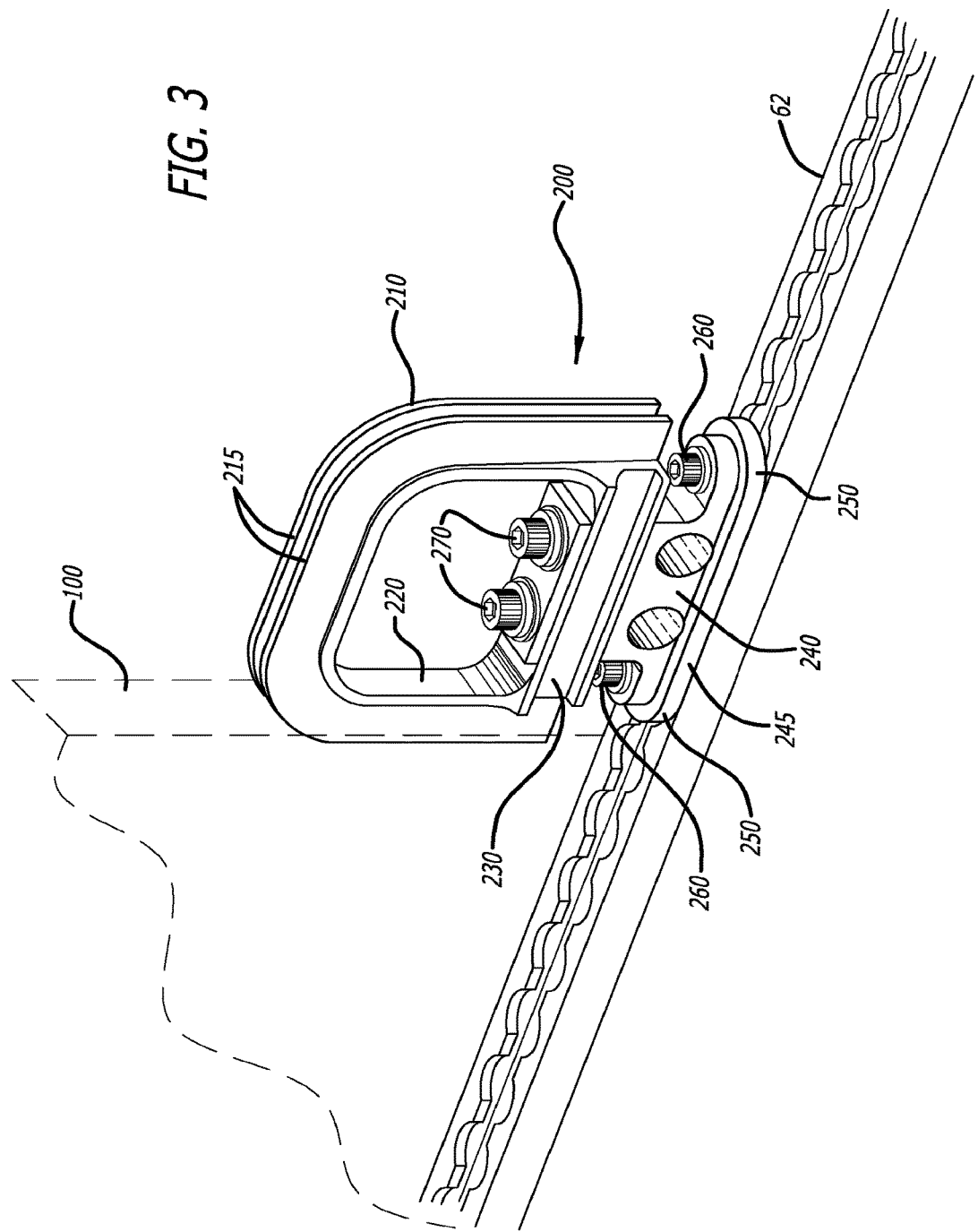

AIRCRAFT MONUMENT INTEGRATED ATTACHMENT DEVICE

CROSS-REFERENCES TO RELATED APPLICATIONS

This application is a continuation application of U.S. application Ser. No. 13/851,838, filed Mar. 27, 2013 which claims priority from U.S. application Ser. No. 61/616,952, filed Mar. 28, 2012, the contents of which are incorporated herein by reference in their entirety.

BACKGROUND

Aircraft interior space is made up of various compartments, such as galleys, crew cabins, stowages, closets, lavatories, crew rest quarters, and other facility and storage monuments. These compartments of typically formed by partitions or structural units that separate one compartment from another. To meet airworthiness requirements on commercial passenger-carrying aircraft for the retention of compartments such as galleys attachment or connection devices must be used to secure them to the aircraft's airframe structure. Commonly, these take two forms: type one securing the lower section of the monument to the floor; and type two securing the upper section to the ceiling. Common practice is to manufacture these parts from a combination of aluminum, stainless steel and titanium. These attachments ultimately secure the monuments to the fuselage (or airframe), which may be by means of seat tracks, cross braces, floor beams and other subsidiary parts of the aircraft structure.

Floor attachments normally connect to fixed locations, or "hard points," within the cabin. These fittings do not allow relocation of the monuments to a new location, unless seat track mountings are used that allow either fore and aft movement, or lateral movement, along the track depending upon the orientation of the track. However, a full range of motion is typically unavailable for monument attachments in an aircraft. Floor attachments, or flutter points for low load bearing floor attachments, are typically bonded with glue and/or bolted to the monument as a secondary process, following manufacture of the monument's structural composite panel. Such an assembly typically uses a viscous liquid adhesive, and forms part of the basic monument structure. Due to the fact that only limited projection beyond the outer envelope of the monument is allowed, the floor fittings are commonly offset to the inside of the monument, and mounted on the composite panel's surface or through the panel to a greater or lesser degree, dependent upon design. Where variations exist in the position of the monument, or the position of the hard point attachments or seat tracks, the floor fitting has to be installed in that specific location during manufacture, and relocation or repositioning is limited and every orientation, change in monument location or change in foot print size requires a new location for the floor attachments as part of the structure.

The existing monument attachment design leads to a bias stress loading to one skin of the composite panel, which often fails to optimize the load path into the structure and can lead to a requirement for additional reinforcement in the form of a metallic plate or "doubler" to help spread the stress more effectively throughout the monument and avoid stress concentrations. Unfortunately, this not only adds weight to the aircraft, but is an inefficient means to distribute the load. More recent floor attachment designs have required adjustment in the Z direction as well as the X and Y planes for purposes of alignment during the installation onto the aircraft, which increases the inward projection.

On monuments such as galleys, this has led to a variation in the width of compartments in order that the wheels of the service carts or trolleys avoid contact with the inward projection of the floor fittings. This, in turn, does not allow standardization of cart bay doors, except for the widest possible dimension. This also impacts the efficiency of air circulation around carts in chilled compartments, and produces variations in the widths of standard guide or protection parts such as rub/bump strips in order to compensate for the different offsets.

Additionally, with chilled or refrigerated galleys the presence of a sizable metallic component projecting through the cart bay wall produces significant undesirable cold bridges that can compromise the integrity of the chilled compartment, from a thermal resistance point of view, and the result is a failure to maintain the specified compartment temperature for maintaining perishable food stuffs during normal aircraft operations.

SUMMARY OF THE INVENTION

The present invention is an aircraft monument attachment device that maintains the airworthiness of floor attachments while eliminating some of the problems associated with current designs. Namely, a floor attachment is disclosed that is integrated into the interior of the monument's structural panel and may be installed during the primary manufacturing process (hot bonded) or as a post-process (cold bonded). This design offers several advantages over current conventional floor fittings. For one, the fitting eliminates the need for an offset and provides a more direct load path through the fitting and into the aircraft frame. Also, the projection of the fitting is significantly reduced, allowing standardization of cart compartment doors and standard guide/protection parts. This is because the fitting is located entirely or almost entirely within the composite panel of the monument, save a small portion of a collar or mounting ring. The fitting transfers load stresses into both skins of the composite panel, significantly improving the effectiveness of the load path. Where additional localized stiffening is required, extra plies of UD (uni-directional) fiber can be added to the composite sandwich as an integral part of the panel itself, or cold bonded non-metallic doublers can be added to one or both skins.

The floor fitting can be pre-manufactured from aluminum, titanium, a reinforced, hardened plastic or carbon fiber, and either be machined, cast or injection molded depending on the calculated strength requirements and/or advances in material capabilities. An advantage of the present invention is that the fitting still allows X, Y and Z adjustment at monument installation but without significantly increasing inward floor fitting projection and without additional projection outside the galley envelope.

The fitting may be manufactured to accommodate either single or twin bolt fixings as primary attachments. A low load flutter point or stabilizer fitting could also use the same manufacturing and bonding principles with the required limit on X, Y, or Z movement provisioned for.

Other features and advantages of the present invention will become more apparent from the following detailed description of the preferred embodiments in conjunction with the accompanying drawings, which illustrate, by way of example, the operation of the invention.

BRIEF DESCRIPTION OF THE DRAWINGS

FIG. 1 is an elevated, perspective view of the attachment device of the present invention;

FIG. 2 is the attachment device of FIG. 1 installed in an aircraft monument; and FIG. 3 is an elevated, perspective view of an alternate embodiment.

DETAILED DESCRIPTION OF THE PREFERRED EMBODIMENTS

FIG. 1 illustrates a first embodiment of a monument attachment device according to the present invention. The attachment device 10 comprises two horseshoe shaped plates 20 having an outer radius along the perimeter and an inner radius along the inner edge. The two plates 20 are joined together along the inner radius by a rigid panel 30, such that there is an arcuate gap between the two plates 20, and between the rigid panel 30 and the outer radius of the two plates 20. The connection of the two plates to the rigid panel 30, such as by welding or as a one piece casting or molding, for example, is sufficient to transfer loads from the panel 30 to the plates 20.

At the base of the attachment device 10 is a block 40 including a pair of lugs 45 formed in the block 40 to secure to the fitting to an attachment point on the aircraft. Each lug 45 includes a through hole 50 for receiving a fastener that fixes the block 40 and attachment device 10 to a transversely oriented rail 62 mounted on the floor or ceiling of the aircraft. Above the lug 45, a hollowed cylindrical recess 72 may be formed in the block to provide clearance to insert a fastener, such that a neck 64 is created in the block 40 along an upper surface. The block 40 also includes a pair of holes 66 that can be used to secure the plates 20 to the block 40. The bottom edge 70 of the plates 20 coincides with a bottom edge of the block 40 such that the attachment device lays flush with a floor of the aircraft.

In FIG. 2, the attachment device 10 is integrally mounted into an aircraft monument 100 such as a stowage compartment, galley wall, or the like. A pair of composite panels 110 form the wall of the monument 100, and sandwiched between the walls 110 is a composite panel core material 120 that forms the interior of the wall structure. At the base of the wall 100, between the panels 110, is the floor fitting 10 integrated into the wall structure and used to mount the wall 100 to the rail 62 along the floor of the aircraft. The rail 62 includes a series of circular slots or recesses 66 that receive the mounting rods or fasteners. The cooperation of the attachment device 10 and the rail 62 allow the monument 100 to be positioned along the rail easily and also allows the monument to be moved without damage to the floor or the monument. The window of the attachment device 10 provides a space above the cylindrical lugs 40 that can be used to insert and remove the fastener, and the arch shape of the fitting contributes to the overall strength of the fitting.

In a preferred embodiment, the attachment device 10 is integrated in the wall structure of the monument 100 during the primary build phase, eliminating the need for a secondary operation and greatly improving the component strength and the ability of the structure to handle both static and dynamic loads. This is particularly important in a vehicle such as an aircraft, which is subject to dynamic loads on a consistent basis. The lug 40 creates a small offset that allow the monument structure to have a greater proportion of standardized parts while reducing the weight of the component as well as the footprint of the monument. In a non-metallic form, such as a composite or hardened plastic, the fitting 10 can be mass produced, very light, and resistant to corrosion. However, this does not preclude the post panel manufacturing process (e.g., pressed panels) cold bonding of either the single or twin bolt floor fitting.

While the embodiment of FIGS. 1 and 2 are particularly suited for aligning the monument transversely to the rail 62, the embodiment of FIG. 3 can be used to align the monument parallel to the rail 62. The attachment device 200 has a "D" shaped outer member 210 comprising two parallel plates 215 extending from a rim 220. The rim 220 is affixed to a beam 230 having a pair of holes arranged vertically through the beam. The beam 230 is mounted on a platform 240 having an elongated body 245 with circular ends 250. Fasteners 260 pass through the platform 240 at the circular ends 250 to mount the attachment device 200 to the rail 62. Another pair of fasteners 270 can be used to secure the attachment device 200 to the platform 240, and can also be used to secure the platform 240 to the rail 62. The attachment device 200 can be embedded or integrally formed into a monument 100 such that the monument can be attached to the rail 62 in a parallel configuration as shown in FIG. 3.

An important consideration of the present invention is the ability to transfer both static and dynamic loads from the attachment device 10, 200 evenly into both skins of the structural panels 110. When dynamic or static loading is created at the juncture between the fitting and the floor, the stress emanates from the areas adjacent the fastener and is directed outward toward the panels where it moves through the panels in roughly equal amounts. This distributed loading helps to keep the panel and the fitting at manageable stress levels and prolong the life of the fitting and the panel in the presences of static and dynamic loading. Where additional localized stiffening is required, extra plies of UD (uni-directional) fiber 140 can be added to the fitting to increase the strength of the attachment device 10. Alternatively, or in addition to, carbon fiber doublers may be used to spread stress loads to a larger area of the structural panel skin.

The present invention presents several benefits and improvements over existing monument fittings. One is that beverage cart bay offsets that are necessary to avoid the existing fitting projections can be eliminated. Another is that compartment door widths and other component sizes can be standardized. The overall width or centerline of the galley or monument is reduced. In the case of chilled cart (or trolley) compartments, cold bridging through the floor fittings are virtually eliminated. The fitting itself can be the subject of mass production techniques as the component is standardized, such as injection molding, compression molding, and the like. Additionally, long term problems caused by corrosion of the metallic attachment are virtually eliminated since the fitting is largely shielded by the wall panels.

Although the foregoing descriptions and accompanying drawings are intended to set forth the inventor's best mode, it is to be understood that the invention may be embodied in other forms without departure from the benefits and characteristics described and depicted. the embodiments described therefore are to be considered in all respects as illustrative and not restrictive. Although the present invention has been described in terms of certain preferred embodiments, other embodiments that are apparent to those of ordinary skill in the art are also within the scope of the present invention.

I claim:

1. A method for connecting a monument attachment apparatus to an aircraft panel, comprising:
    providing the aircraft panel comprising a first exterior wall, a second exterior wall, a core, and a first aperture extending through the first exterior wall, the second exterior wall and the core;
    providing the monument attachment apparatus comprising a second aperture configured to receive a fastener, a user's fingers and a tool to fasten the fastener, a pair of spaced apart parallel flanges, the spacing of said flanges generally corresponding to a width of the aircraft panel, and a third aperture to receive a fastener to couple the panel to an aircraft, the third aperture being in a plane substantially perpendicular to a plane of the second aperture;
    aligning the monument attachment apparatus in the first aperture in the aircraft panel such that a bottom edge of the aircraft panel aligns with a bottom edge of the monument attachment apparatus; and
    bonding the monument attachment apparatus to the aircraft panel, wherein bonding comprises bonding a first flange of the pair of spaced apart flanges to an interior surface of the first exterior wall and bonding a flange of the pair of spaced apart flanges to an interior surface of the second interior wall;
    wherein, upon bonding the monument attachment apparatus to the aircraft panel, the first aperture provides a recess for introducing a fastener into the second aperture and through the third aperture.

2. The method of claim 1, wherein bonding the monument attachment apparatus to the aircraft panel comprises hot bonding during a primary manufacturing process of the aircraft panel.

3. The method of claim 1, wherein bonding the monument attachment apparatus to the aircraft panel comprises cold bonding after a primary manufacturing process of the aircraft panel.

4. The method of claim 1, wherein, upon bonding the monument attachment apparatus to the aircraft panel, the monument attachment apparatus is disposed to transfer load stresses to both the first exterior wall and the second exterior wall of the aircraft panel.

5. The method of claim 4, wherein, upon installation within an aircraft, the monument attachment apparatus transfers load stresses substantially evenly into the first exterior wall and the second exterior wall.

6. The method of claim 1, wherein the monument attachment apparatus includes a fourth aperture proximate the third aperture, the third aperture and the fourth apertures aligned to corresponding fastener receiving connections of a structural rail of an aircraft.

7. The method of claim 1, wherein the bonding comprises bonding at least one ply of unidirectional fiber composite between the core of the panel and the spaced apart flanges of the monument attachment apparatus.

8. The method of claim 7, wherein the unidirectional fiber composite comprises carbon fiber.

9. The method of claim 1, wherein the first aperture has a contour that is U-shaped.

10. The method of claim 1, wherein the aircraft panel further comprises carbon fiber doublers to spread stress loads to a larger area of each of the first exterior wall and the second exterior wall.

11. An aircraft panel assembly, comprising:
    an aircraft panel comprising a first exterior wall, a second exterior wall, a core, and a first aperture extending through the first exterior wall, the second exterior wall and the core; and
    a monument attachment apparatus comprising a second aperture configured to receive a fastener, a user's fingers and a tool to fasten the fastener, and a pair of substantially parallel plates extending from a member aligned with a bottom edge of the aircraft panel, wherein
        a first plate of the pair of plates is bonded to an interior surface of the first exterior wall,
        a second plate of the pair of plates is bonded to an interior surface of the second interior wall, and
        a portion of the core is disposed in a gap between the pair of plates and bonded to a portion of an interior surface of each of the parallel plates;
    wherein the monument attachment apparatus includes a third aperture in a plane substantially perpendicular to a plane of the first aperture, the third aperture configured to align with a corresponding receptacle disposed on a structural frame of an aircraft cabin;
    and wherein the monument attachment apparatus is disposed to transfer forces from the structural frame to both the first exterior wall and the second exterior wall of the aircraft panel directly or through a layer of adhesive.

12. The aircraft panel assembly of claim 11, wherein the structural frame is disposed in the ceiling of the aircraft cabin.

13. The aircraft panel assembly of claim 11, wherein, upon installation within the aircraft cabin, the monument attachment apparatus transfers load stresses substantially evenly to the first exterior wall and the second exterior wall.

14. The aircraft panel assembly of claim 11, wherein at least one ply of unidirectional fiber is disposed adjacent the core and the interior surface of each of the pair of plates.

15. The aircraft panel assembly of claim 11, wherein the monument attachment apparatus is formed by casting.

16. The aircraft panel assembly of claim 11, wherein the aircraft panel further comprises carbon fiber doublers to spread stress loads to a larger area of each of the first exterior wall and the second exterior wall.

17. The aircraft panel assembly of claim 11, wherein, upon installation, the monument attachment apparatus directly abuts the structural frame.

18. The aircraft panel assembly of claim 17, wherein, upon installation, a portion of the monument attachment apparatus directly abuts a floor of the aircraft cabin.

19. The aircraft panel assembly of claim 11, wherein the monument attachment apparatus further comprises a fourth aperture proximate the third aperture, wherein both the third and fourth apertures are configured to align with openings in a rail system in a floor of the aircraft cabin.

20. The aircraft panel assembly of claim 11, wherein the first aperture has a contour that is U-shaped.

* * * * *